United States Patent
Craggs

(10) Patent No.: US 11,886,550 B2
(45) Date of Patent: Jan. 30, 2024

(54) GEOGRAPHICALLY LOCAL LICENSE SHARING

(71) Applicant: AppDirect, Inc., San Francisco, CA (US)

(72) Inventor: Daniel P. Craggs, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 341 days.

(21) Appl. No.: 16/705,059

(22) Filed: Dec. 5, 2019

(65) Prior Publication Data

US 2021/0173900 A1   Jun. 10, 2021

(51) Int. Cl.
*G06F 21/10* (2013.01)
*H04L 9/08* (2006.01)
(Continued)

(52) U.S. Cl.
CPC .......... *G06F 21/105* (2013.01); *H04L 9/0872* (2013.01); *H04L 9/3213* (2013.01);
(Continued)

(58) Field of Classification Search
CPC ........... G06F 21/105; G06F 2221/0711; G06F 2221/0773; G06F 21/10; G06F 2221/2111;
(Continued)

(56) References Cited

U.S. PATENT DOCUMENTS

| 7,752,450 B1 * | 7/2010 | Palmer | H04L 63/0838 |
| | | | 726/21 |
| 2003/0084306 A1 * | 5/2003 | Abburi | G06F 21/10 |
| | | | 713/188 |

(Continued)

FOREIGN PATENT DOCUMENTS

WO   WO-2018207174 A1 * 11/2018

OTHER PUBLICATIONS

"An Interoperable and Secure Architecture for Internet-Scale Decentralized Personal Communication", David Alan Bryan, May 2010, The college of William and Mary, Department of Computer Science (Year: 2010).*

*Primary Examiner* — Duan Zhang
(74) *Attorney, Agent, or Firm* — McDermott Will & Emery LLP

(57) ABSTRACT

Various aspects of the subject technology relate to systems, methods, and machine-readable media for geographically local license sharing. The method includes transmitting, from a media server, a shared secret to a licensed client, the licensed client broadcasting a wireless signal comprising a unique identifier associated with the licensed client. The method also includes receiving, at the media server, an access token and the unique identifier of the licensed client from an unlicensed client, the access token and the unique identifier received by the unlicensed client from the licensed client based on a proximity of the unlicensed client to the licensed client. The method also includes validating, by the media server, the access token based on the unique identifier and the shared secret with the licensed client. The method also includes enabling the unlicensed client to access media content of the media server upon validation of the access token.

20 Claims, 4 Drawing Sheets

(51) Int. Cl.
    *H04W 12/63*     (2021.01)
    *H04L 9/32*     (2006.01)

(52) U.S. Cl.
    CPC ......... *H04W 12/63* (2021.01); *G06F 21/1014* (2023.08); *G06F 21/1077* (2023.08); *G06Q 2220/18* (2013.01)

(58) Field of Classification Search
    CPC ... H04L 9/0872; H04L 9/3213; H04L 9/3228; H04L 2209/603; H04L 2209/805; H04W 12/63; G06Q 2220/18
    See application file for complete search history.

(56) References Cited

U.S. PATENT DOCUMENTS

| | | | | |
|---|---|---|---|---|
| 2013/0174223 | A1* | 7/2013 | Dykeman | G06F 21/10 726/4 |
| 2015/0135274 | A1* | 5/2015 | Huang | H04W 4/023 726/4 |
| 2017/0279798 | A1* | 9/2017 | Reynolds | H04L 63/0853 |
| 2018/0278603 | A1* | 9/2018 | Yabe | H04L 63/0892 |
| 2020/0304307 | A1* | 9/2020 | Fujimaki | H04L 9/3213 |
| 2020/0314167 | A1* | 10/2020 | Achyuth | H04L 63/107 |

* cited by examiner

GEOGRAPHICALLY LOCAL LICENSE SHARING

TECHNICAL FIELD

The present disclosure generally relates to license sharing, and more particularly to geographically local license sharing.

BACKGROUND

Online subscriptions for services often exist where a vendor wishes to offer a license for a home or family. However, this often leads to unintended use cases where subscribers give away their login details to others, who then may access the content for free at any time and from any location.

A current approach to limiting this unintended consequence is to offer a limited number of licenses, but these are often used with multiple people sharing a single account in different locations and reduces the potential revenue of the license provider. Additionally, the customer is further restricted because they may own a dozen devices and should not have to care which one they use if they are a paying customer.

BRIEF SUMMARY

The subject disclosure addresses these shortcomings by allowing access to content for an infinite amount of devices within a home, but not any devices outside of this area. According to an aspect, a licensed client may broadcast a wireless signal (e.g., Bluetooth Low Energy (BLE)) and provide evolving one time passcodes (OTP) via this signal for nearby devices. The nearby devices can use these OTPs along with an identifier of the licensed client to temporarily gain access to the online service by either appending the metadata to its requests or by authenticating with the service periodically based on a configurable expiry time. The licensed client may either broadcast its OTPs freely or choose to approve each nearby client and privately send the OTPs. In an implementation, a server may send encrypted payloads of premium content to secondary devices that may only be decrypted using the OTPs as a secret key. That way, the server would not have to constantly verify the OTPs from secondary devices. The secondary devices would still receive the OTPs from the primary device in the normal way. In an additional embodiment, a JSON Web Token (JWT) may also be utilized instead of the OTPs.

According to one embodiment of the present disclosure, a computer-implemented method for geographically local license sharing is provided. The method includes transmitting, from a media server, a shared secret to a licensed client, the licensed client broadcasting a wireless signal comprising a unique identifier associated with the licensed client. The method also includes receiving, at the media server, an access token and the unique identifier of the licensed client from an unlicensed client, the access token and the unique identifier received by the unlicensed client from the licensed client based on a proximity of the unlicensed client to the licensed client. The method also includes validating, by the media server, the access token based on the unique identifier and the shared secret with the licensed client. The method also includes enabling the unlicensed client to access media content of the media server upon validation of the access token.

According to one embodiment of the present disclosure, a system is provided including a processor and a memory comprising instructions stored thereon, which when executed by the processor, causes the processor to perform a method for geographically local license sharing. The method includes transmitting, from a media server, a shared secret to a licensed client, the licensed client broadcasting a wireless signal comprising a unique identifier associated with the licensed client. The method also includes receiving, at the media server, an access token and the unique identifier of the licensed client from an unlicensed client, the access token and the unique identifier received by the unlicensed client from the licensed client based on a proximity of the unlicensed client to the licensed client. The method also includes validating, by the media server, the access token based on the unique identifier and the shared secret with the licensed client. The method also includes enabling the unlicensed client to access media content of the media server upon validation of the access token.

According to one embodiment of the present disclosure, a non-transitory computer-readable storage medium is provided including instructions (e.g., stored sequences of instructions) that, when executed by a processor, cause the processor to perform a method for geographically local license sharing. The method includes transmitting, from a media server, a shared secret to a licensed client, the licensed client broadcasting a wireless signal comprising a unique identifier associated with the licensed client. The method also includes receiving, at the media server, an access token and the unique identifier of the licensed client from an unlicensed client, the access token and the unique identifier received by the unlicensed client from the licensed client based on a proximity of the unlicensed client to the licensed client. The method also includes validating, by the media server, the access token based on the unique identifier and the shared secret with the licensed client. The method also includes enabling the unlicensed client to access media content of the media server upon validation of the access token.

According to one embodiment of the present disclosure, a system is provided that includes means for storing instructions, and means for executing the stored instructions that, when executed by the means, cause the means to perform a method for geographically local license sharing. The method includes transmitting, from a media server, a shared secret to a licensed client, the licensed client broadcasting a wireless signal comprising a unique identifier associated with the licensed client. The method also includes receiving, at the media server, an access token and the unique identifier of the licensed client from an unlicensed client, the access token and the unique identifier received by the unlicensed client from the licensed client based on a proximity of the unlicensed client to the licensed client. The method also includes validating, by the media server, the access token based on the unique identifier and the shared secret with the licensed client. The method also includes enabling the unlicensed client to access media content of the media server upon validation of the access token.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
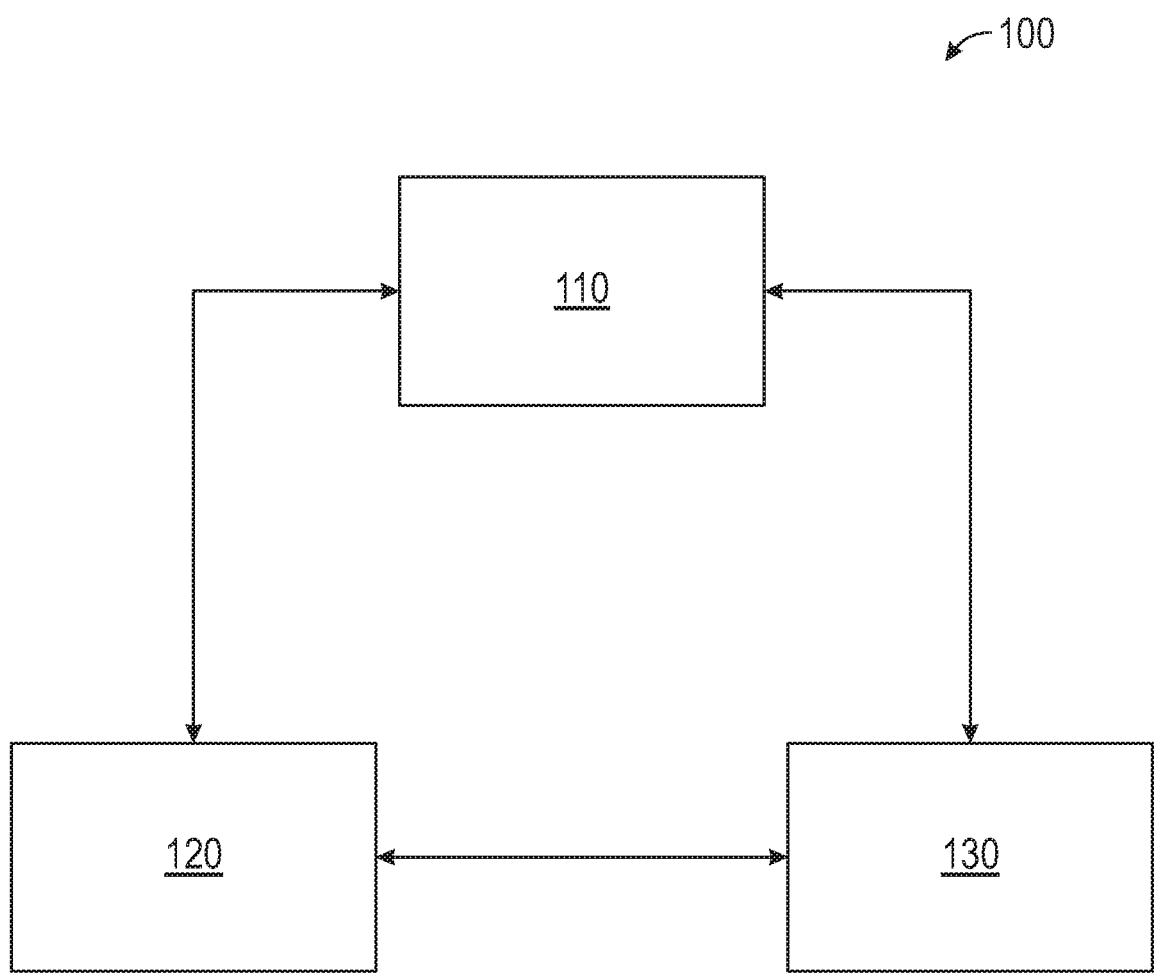
FIG. 1 illustrates an example system for geographically local license sharing, according to certain aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Online subscriptions for services often exist where a vendor wishes to offer a license for a home or family. However, this often leads to unintended use cases where subscribers give away their login details to others, who then may access the content for free at any time and from any location.

A current approach to limiting this unintended consequence is to offer a limited number of licenses, but these are often used with multiple people sharing a single account in different locations and reduces the potential revenue of the license provider. Additionally, the customer is further restricted because they may own a dozen devices and should not have to care which one they use if they are a paying customer.

Aspects of the present disclosure address these issues by allowing access to content for an infinite amount of devices within a home, but not any devices outside of this area. According to an aspect, a licensed client may broadcast a wireless signal (e.g., Bluetooth Low Energy (BLE)) and provide evolving one time passcodes (OTP) or via this signal for nearby devices. The nearby devices can use these OTPs along with an identifier of the licensed client to temporarily gain access to the online service by either appending the metadata to its requests or by authenticating with the service periodically based on a configurable expiry time. The licensed client may either broadcast its OTPs freely or choose to approve each nearby client and privately send the OTPs. In an implementation, a server may send encrypted payloads of premium content to secondary devices that may only be decrypted using the OTPs as a secret key. That way the server would not have to constantly verify the OTPs from secondary devices. The secondary devices would still receive the OTPs from the primary device in the normal way. In an additional embodiment, a JSON Web Token (JWT) may also be utilized instead of the OTPs.

The disclosed system addresses a problem in traditional license sharing tied to computer technology, namely, the technical problem of limiting license sharing abuse while also maintaining customer satisfaction in granting access to content. The disclosed system solves this technical problem by providing a solution also rooted in computer technology, namely, by providing for geographically local license sharing. The disclosed subject technology further provides improvements to the functioning of the computer itself because it reduces processing and bandwidth costs associated with license sharing.

FIG. 1 illustrates an example system 100 for geographically local license sharing, according to certain aspects of the disclosure. The system 100 may include a server 110, a licensed client 120, and an unlicensed client 130, all communicatively coupled together. It is understood that although only one server, one licensed client, and one unlicensed client are illustrated, more than one of each may be included without departing from the scope of the disclosure.

The server 110 may include a media server, for example, that may validate credentials for accessing the media. The licensed client 120 may include user devices such as a smart TV, a laptop, tablet computer, desktop computer, mobile device, etc. The unlicensed client 130 may also include a smart TV, a laptop, tablet computer, desktop computer, mobile device, etc. It is understood that these devices are exemplary only, and additional user devices are allowed without departing from the scope of the disclosure.

According to aspects, the licensed client 120 may be determined by a user first logging into a device. By logging in and verifying their credentials with the server 110, the device may become recognized as the licensed client 120. Additional licensed clients may also be determined by logging in and the verification of user credentials with the server 110. Thereafter, any device that has not been logged in by the user may be determined to be an unlicensed device. For example, a user may first login to their account on a desktop computer. The desktop computer is then recognized as the licensed client 120. Any device not logged into by the user, such as a smartphone, laptop, etc., would be determined to be an unlicensed client 130.

Figure 2:
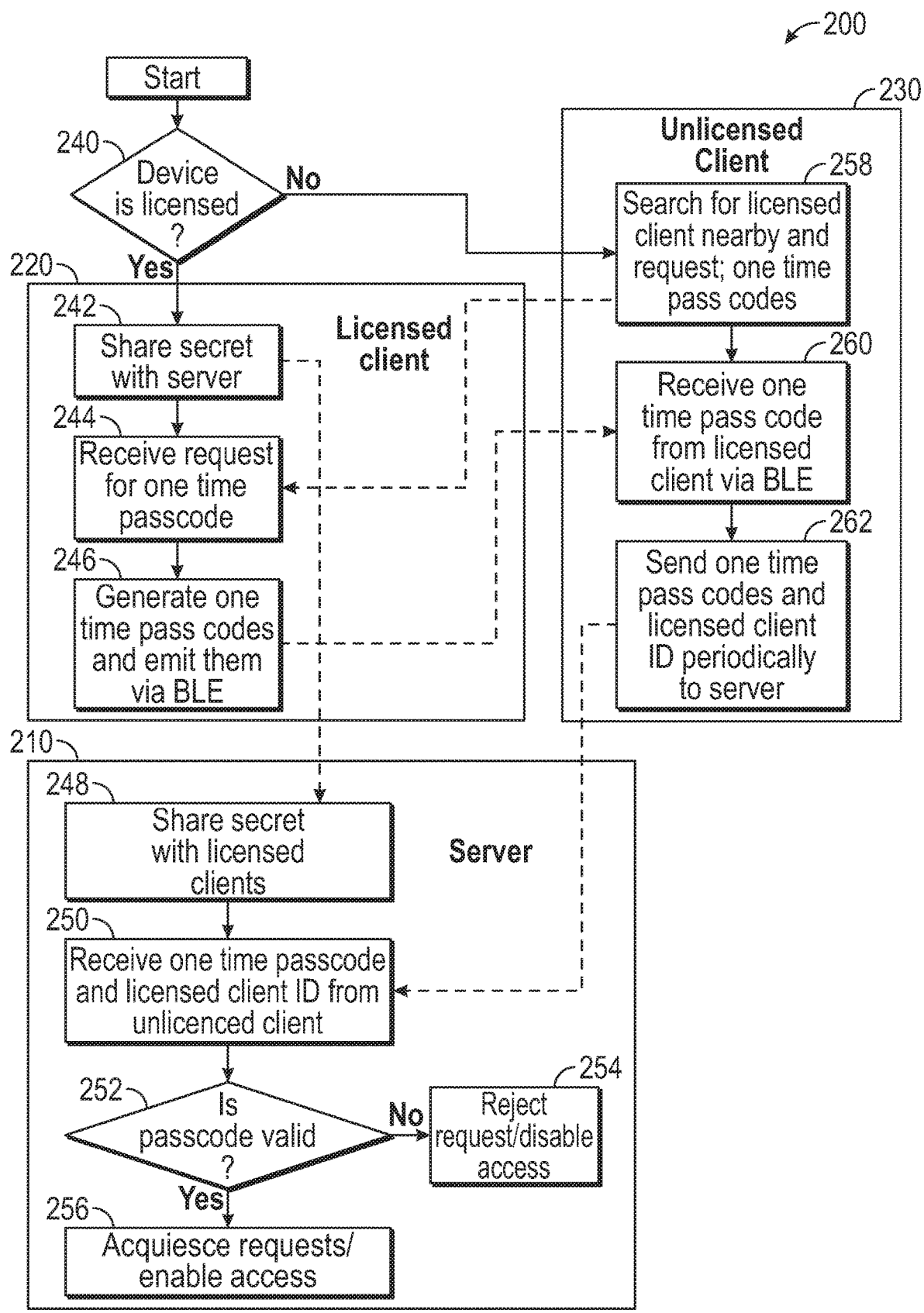
FIG. 2 illustrates an example flow diagram for geographically local license sharing, according to certain aspects of the disclosure.

FIG. 2 illustrates an example flow diagram 200 for geographically local license sharing, according to certain aspects of the disclosure. The flow diagram 200 may begin at step 240 by determining whether a user device is licensed. For example, a user may log into their account through a user device. If the login process is authenticated, then the user device is determined to be a licensed client 220. The flow may then proceed to step 242, where the licensed client 220 shares a secret with a server 210. The secret may include an encrypted key that may only be decrypted by knowing the secret. At 248, the secret is shared by the server 210 with the licensed client 220.

If the user device is unlicensed, then the user device is determined to be an unlicensed client 230. At step 258, the unlicensed client 230 searches for licensed clients nearby and requests an access token (e.g., an OTP or JWT). For example, the unlicensed client 230 may initiate a scan via BLE, or other wireless signal, and may detect that the licensed client 220 is nearby. According to aspects, the unlicensed client 230 may detect licensed clients within a predetermined range. The predetermined range may also be defined by a range of a wireless signal of the licensed client 220 (e.g., within 100 yards, although other values may be defined).

At step 244, the licensed client 220 receives the request for the access token from the unlicensed device 230. At step 260, the unlicensed client 230 receives the access token from the licensed client 220 via BLE, or other wireless signal. At step 246, the licensed client continues to generate access tokens and emits them via BLE or other wireless signals so other unlicensed clients may also receive access to content.

At step 262, the unlicensed client 230 sends the access token and an identifier of the licensed client 220 to the server 210. The identifier may include any identifying information of the licensed client 220. According to aspects, the access token and the identifier may be sent periodically to the server 210 to continue receiving access to the content. For example, a timeout period may be defined such that the unlicensed client 230 would resend the access token and the identifier to the server 210 to continue receiving access to content. The timeout period may be user defined (e.g., 10 seconds, although other shorter or longer values are also allowed).

At step 250, the server 210 receives the access token and identifier from the unlicensed client 230. At step 252, the server 210 determines whether the access token is valid. If yes, then access is granted at step 256. For example, the server 210 will then allow the unlicensed client 230 access to services and/or premium content/premium features. If no, then access is denied at step 254. For example, the server 210 may confirm validity of the unlicensed client 230 by looking up the identifier and matching it with the licensed client 220 and verifying the shared secret.

In an implementation, the server 210 may send encrypted payloads of premium content to secondary devices (e.g., the unlicensed client 230) that may only be decrypted using the access tokens as a secret key. That way the server 210 would not have to constantly verify the access tokens from the secondary devices. The secondary devices would still receive the access tokens from the primary device (e.g., the licensed client 220) in the way described above.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 3:
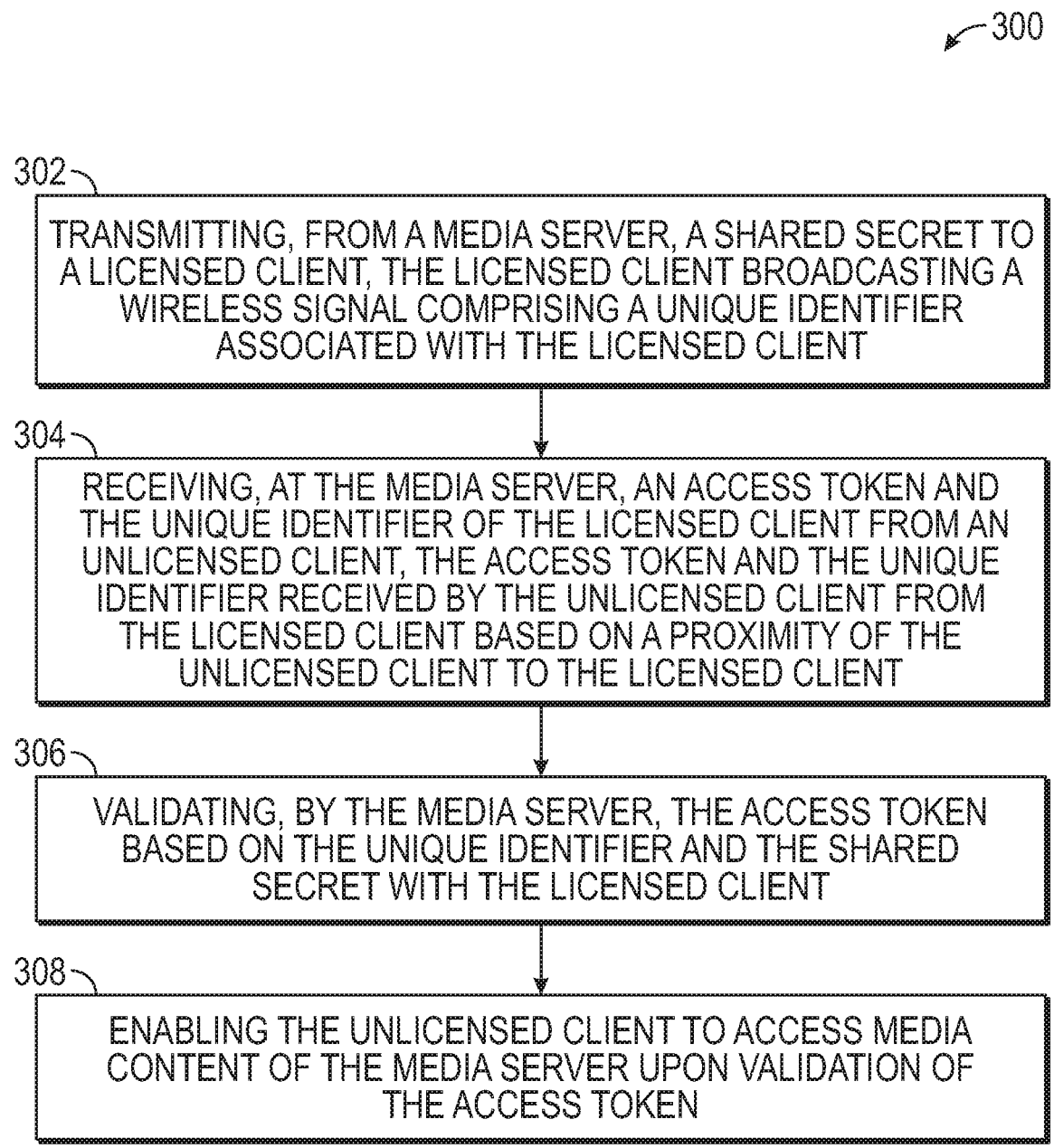
FIG. 3 illustrates an example flowchart for geographically local license sharing, according to certain aspects of the disclosure.

FIG. 3 illustrates an example flowchart (e.g., process 300) for geographically local license sharing, according to certain aspects of the disclosure. For explanatory purposes, the example process 300 is described herein with reference to FIGS. 1-2. Further for explanatory purposes, the steps of the example process 300 are described herein as occurring in serial, or linearly. However, multiple instances of the example process 300 may occur in parallel. For purposes of explanation of the subject technology, the process 300 will be discussed in reference to FIGS. 1-2.

At step 302, the process 300 includes transmitting, from a media server, a shared secret to a licensed client, the licensed client broadcasting a wireless signal comprising a unique identifier associated with the licensed client a wireless signal is broadcast through a licensed client. At step 304, the process 300 includes receiving, at the media server, an access token and the unique identifier of the licensed client from an unlicensed client, the access token and the unique identifier received by the unlicensed client from the licensed client based on a proximity of the unlicensed client to the licensed client. At step 306, the process 300 includes validating, by the media server, the access token based on the unique identifier and the shared secret with the licensed client. At step 308, the process 300 includes enabling the unlicensed client to access media content of the media server upon validation of the access token.

For example, as described above in relation to FIGS. 1-2, at step 302, a media server 110 and 220 transmits a shared secret to a licensed client 120 and 220. For example, the wireless signal may include a unique identifier associated with the licensed client 120 and 220. At step 304, the media server 110 and 220 receives an access token and the unique identifier of the licensed client 120 and 220 from an unlicensed client 130 and 230. The access token and the unique identifier may be received by the unlicensed client 130 and 230 from the licensed client 120 and 220 based on a proximity of the unlicensed client 130 and 230 to the licensed client 120 and 220. At step 306, the media server 110 and 210 validates the access token based on the unique identifier and the shared secret with the licensed client 120 and 220. At step 308, the media server 110 and 210 enables the unlicensed client 130 and 230 to access media content upon validation of the access token.

According to an aspect, the shared secret includes an encrypted key. According to an aspect, the wireless signal includes a Bluetooth signal. According to an aspect, the access token allows access to encrypted payloads of premium content. According to an aspect, the access token includes an OTP or a JWT.

According to an aspect, the process 300 further includes receiving the access token based on a configured timeout. According to an aspect, the access token is encrypted based on the shared secret. According to an aspect, the process 300 further includes decrypting the access token to confirm the shared secret with the licensed client.

Figure 4:
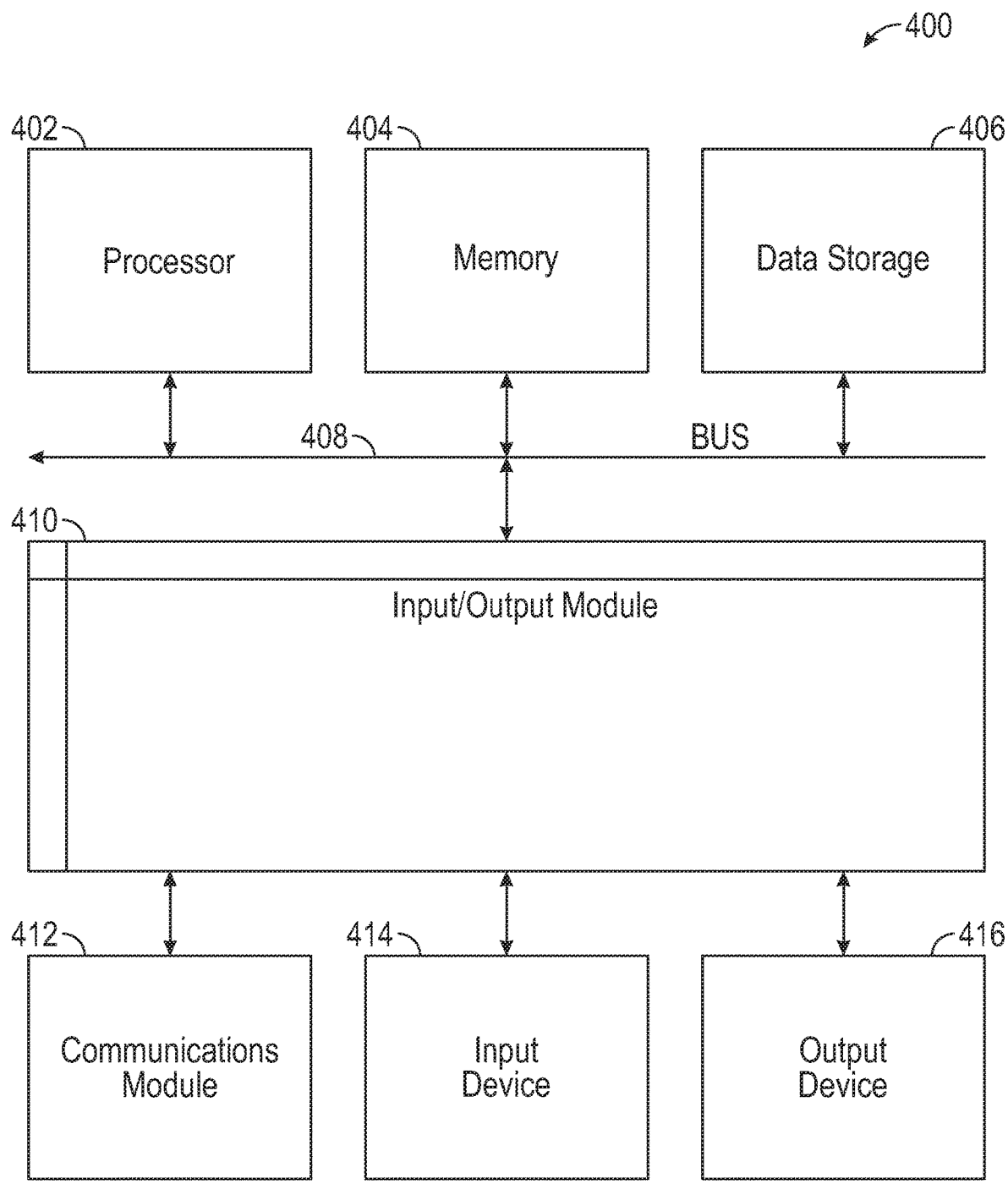
FIG. 4 is a block diagram illustrating an example computer system (e.g., representing both client and server) with which aspects of the subject technology can be implemented.

FIG. 4 is a block diagram illustrating an exemplary computer system 400 with which aspects of the subject technology can be implemented. In certain aspects, the computer system 400 may be implemented using hardware or a combination of software and hardware, either in a dedicated server, integrated into another entity, or distributed across multiple entities.

Computer system 400 (e.g., server and/or client) includes a bus 408 or other communication mechanism for communicating information, and a processor 402 coupled with bus 408 for processing information. By way of example, the computer system 400 may be implemented with one or more processors 402. Processor 402 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 400 can include, in addition to hardware, code that creates an execution environment for the computer program in question, e.g., code that constitutes processor firmware, a protocol stack, a database management system, an operating system, or a combination of one or more of them stored in an included memory 404, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 408 for storing information and instructions to be executed by processor 402. The processor 402 and the memory 404 can be supplemented by, or incorporated in, special purpose logic circuitry.

The instructions may be stored in the memory 404 and implemented in one or more computer program products, i.e., one or more modules of computer program instructions encoded on a computer-readable medium for execution by, or to control the operation of, the computer system 400, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 404 may also be used for storing temporary variable or other intermediate information during execution of instructions to be executed by processor 402.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 400 further includes a data storage device 406 such as a magnetic disk or optical disk, coupled to bus 408 for storing information and instructions. Computer system 400 may be coupled via input/output module 410 to various devices. The input/output module 410 can be any input/output module. Exemplary input/output modules 410 include data ports such as USB ports. The input/output module 410 is configured to connect to a communications module 412. Exemplary communications modules 412 include networking interface cards, such as Ethernet cards and modems. In certain aspects, the input/output module 410 is configured to connect to a plurality of devices, such as an input device 414 and/or an output device 416. Exemplary input devices 414 include a keyboard and a pointing device, e.g., a mouse or a trackball, by which a user can provide input to the computer system 400. Other kinds of input devices 414 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 416 include display devices such as an LCD (liquid crystal display) monitor, for displaying information to the user.

According to one aspect of the present disclosure, the above-described gaming systems can be implemented using a computer system 400 in response to processor 402 executing one or more sequences of one or more instructions contained in memory 404. Such instructions may be read into memory 404 from another machine-readable medium, such as data storage device 406. Execution of the sequences of instructions contained in the main memory 404 causes processor 402 to perform the process steps described herein. One or more processors in a multi-processing arrangement may also be employed to execute the sequences of instructions contained in memory 404. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 400 can include clients and servers. A client and server are generally remote from each other and typically interact through a communication network. The relationship of client and server arises by virtue of computer programs running on the respective computers and having a client-server relationship to each other. Computer system 400 can be, for example, and without limitation, a desktop computer, laptop computer, or tablet computer. Computer system 400 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 400 reads game data and provides a game, information may be read from the game data and stored in a memory device, such as the memory 404. Additionally, data from the memory 404 servers accessed via a network or the bus 408, or the data storage 406 may be read and loaded into the memory 404. Although data is described as being found in the memory 404, it will be understood that data does not have to be stored in the memory 404 and may be stored in other memory accessible to the processor 402 or distributed among several media, such as the data storage 406.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for geographically local license management, comprising:

transmitting, from a media server, a shared secret to a licensed client server broadcasting a wireless signal comprising a unique identifier associated with the licensed client server, wherein the licensed client server is logged into by a user based on user credentials;

periodically receiving, at the media server, an access token and the unique identifier of the licensed client server from an unlicensed client server based on a predefined timeout period, wherein the access token comprises an evolving one-time passcode;

scanning, by the unlicensed client server, a proximity of the licensed client server to the unlicensed client server;

identifying, by the unlicensed client server, the licensed client server is within less than a predetermined range of the unlicensed client server;

receiving, by the unlicensed client server, the access token and the unique identifier from the licensed client server based on the proximity of the licensed client server is less than the predetermined range of the unlicensed client server, wherein the user is not logged into the unlicensed client server;

transmitting, by the unlicensed client server, the access token and the unique identifier to the media server;

validating, by the media server, the access token based on the unique identifier and the shared secret with the licensed client server, wherein validating the access token comprises authenticating the evolving one-time passcode based on a configurable expiry time of the evolving one-time passcode;

enabling, by the media server, the unlicensed client server to access encrypted payloads of premium content of the media server upon a successful validation of the access token; and decrypting, by the unlicensed client server, the encrypted payloads of premium content using the evolving one-time passcode as a secret key.

2. The computer-implemented method of claim 1, wherein the shared secret comprises an encrypted key.

3. The computer-implemented method of claim 1, wherein the wireless signal comprises a short-range wireless communication signal.

4. The computer-implemented method of claim 1, further comprising: receiving the access token based on a configured timeout.

5. The computer-implemented method of claim 1, wherein the access token is encrypted based on the shared secret.

6. The computer-implemented method of claim 1, further comprising: transmitting, from the media server, the encrypted payloads of premium content to the unlicensed client server.

7. The computer-implemented method of claim 1, further comprising: decrypting the access token to confirm the shared secret with the licensed client server.

8. The computer-implemented method of claim 1, wherein the access token comprises a JSON Web Token (JWT).

9. A system for geographically local license management, comprising:
 a licensed client server configured to broadcast a wireless signal comprising a unique identifier associated with the licensed client server, wherein the licensed client server is logged into by a user based on user credentials;
 an unlicensed client server; and
 a media server comprising: a processor; and a memory comprising instructions stored thereon, which when executed by the processor, causes the processor to perform:
  transmitting, from the all media server, a shared secret to the licensed client server,; and
  periodically receiving, at the media server, an access token and the unique identifier of the licensed client server from the unlicensed client server based on a predefined timeout period, wherein the access token comprises an evolving one-time passcode,
 wherein the unlicensed client server configured to:
  scans a proximity of an the licensed client server to the unlicensed client server,
  identifies the licensed client server is within less than a predetermined range of the unlicensed client server
  receives the access token and the unique identifier from the licensed client server based on the proximity of the licensed client server is less than the predetermined range of the unlicensed client server, wherein the user is not logged into the unlicensed client server; and
  transmits the access token and the unique identifier to the media server,
 wherein the instructions of the memory further cause the processor to perform:
  validating the access token based on the unique identifier and the shared secret with the licensed client server, wherein validating the access token comprises authenticating the evolving one-time passcode based on a configurable expiry time of the evolving one-time passcode; and
  enabling the unlicensed client server to access encrypted payloads of premium content of the media server upon a successful validation of the access token,
 wherein the unlicensed client server further configured to:
  decrypt the encrypted payloads of premium content using the evolving one-time passcode as a secret key.

10. The system of claim 9, wherein the shared secret comprises an encrypted key.

11. The system of claim 9, wherein the wireless signal comprises a short-range wireless communication signal.

12. The system of claim 9, further comprising stored sequences of instructions, which when executed by the processor, cause the processor to perform: receiving the access token based on a configured timeout.

13. The system of claim 9, further comprising stored sequences of instructions, wherein the access token is encrypted based on the shared secret.

14. The system of claim 9, further comprising stored sequences of instructions, which when executed by the processor, cause the processor to perform: transmitting, from the media server, the encrypted payloads of premium content to the unlicensed client server.

15. The system of claim 9, further comprising: decrypting the access token to confirm the shared secret with the licensed client server.

16. The system of claim 9, wherein the access token comprises a JSON Web Token (JWT).

17. A non-transitory computer-readable storage medium including instructions that, when executed by all one or more processors, causes the processors to perform a method for geographically local license management, comprising:
 transmitting, from a media server, a shared secret to a licensed client server broadcasting a wireless signal comprising a unique identifier associated with the licensed client server, wherein the licensed client server is logged into by a user based on user credentials;
 periodically receiving, at the media server, an access token and the unique identifier of the licensed client server from an unlicensed client server based on a predefined timeout period, wherein the access token comprises an evolving one-time passcode;
 scanning, by the unlicensed client server, a proximity of the licensed client server to the unlicensed client server;
 identifying, by the unlicensed client server, the licensed client server is within less than a predetermined range of the unlicensed client server;
 receiving, by the unlicensed client server, the access token and the unique identifier from the licensed client server based on the proximity of the licensed client server is less than the predetermined range of the unlicensed client server, wherein the user is not logged into the unlicensed client server;
 transmitting, by the unlicensed client server, the access token and the unique identifier to the media server;
 validating, by the media server, the access token based on the unique identifier and the shared secret with the licensed client server, wherein validating the access token comprises authenticating the evolving one-time passcode based on a configurable expiry time of the evolving one-time passcode;
 enabling, by the media server, the unlicensed client server to access encrypted payloads of premium content of the media server upon a successful validation of the access token; and
 decrypting, by the unlicensed client server, the encrypted payloads of premium content using the evolving one-time passcode as a secret key.

18. The non-transitory computer-readable storage medium of claim 17, wherein the shared secret comprises an encrypted key.

19. The non-transitory computer-readable storage medium of claim 17, wherein the wireless signal comprises a short-range wireless communication signal.

20. The non-transitory computer-readable storage medium of claim 17, wherein the access token comprises a JSON Web Token (JWT).

\* \* \* \* \*